Oct. 1, 1929.       G. A. HARDEN       1,730,072
SLED
Filed Aug. 7, 1928
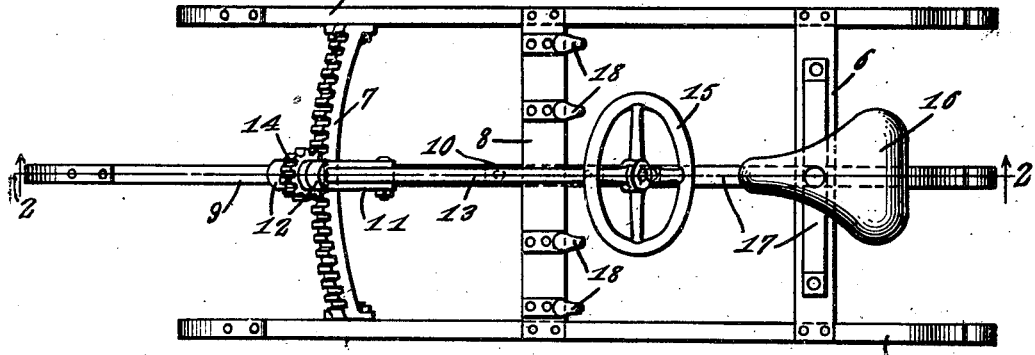
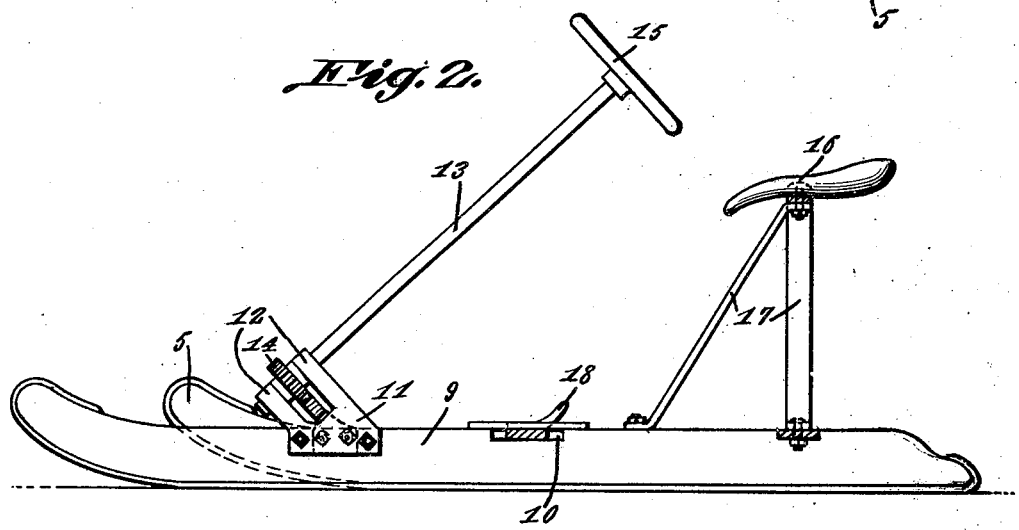
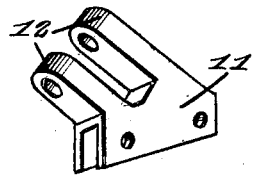
G. A. Harden, Inventor Patented Oct. 1, 1929

1,730,072

UNITED STATES PATENT OFFICE

GEORGE A. HARDEN, OF AKRON, OHIO

SLED

Application filed August 7, 1928. Serial No. 298,091.

This invention relates to sleds or gliders having supporting runners, the primary object of the invention being to provide novel means for guiding the device.

An object of the invention is to provide a guiding runner which is flexible and extended beyond the forward ends of the supporting runners so that it will dig into the surface over which the device is moving to guide the device.

Another object of the invention is the provision of means for flexing the guiding runner laterally to accomplish the steering of the sled.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a device constructed in accordance with the invention.

Figure 2 is a sectional view taken on line 2—2 of Figure 1.

Figure 3 is a perspective view of the bearing member forming a part of the invention.

Referring to the drawing in detail, the reference character 5 designates the supporting runners of the sled which are of the usual and well known construction.

The runners are connected at their rear ends by means of the cross bar 6 and at their front ends by means of the rack bar 7, while the central portions of the runners are connected by the cross bar 8.

Secured to the rear cross bar 6, is a central or guiding runner 9 which is of a length such that the forward end of the runner 9 extends an appreciable distance beyond the forward ends of the runners 5 so that the runner 9 will engage the surface over which the sled is moving, in advance of the runners 5 to insure the guiding result.

This runner 9 is constructed of flexible metal and is provided with a cut out portion 10 to receive the cross bar 8 to permit the runner 9 to flex with respect to the cross bar 8.

Mounted on the runner 9 is a bearing member 11 that embodies spaced arms 12 having bearing openings to receive the steering shaft 13 to which the pinion 14 is secured, the pinion 14 meshing with the teeth of the rack bar 7 so that movement of the shaft 13 and pinion 14 will act to feed the pinion 14 laterally carrying with it the guiding runner 9.

At the upper end of the shaft 13 is a steering wheel 15 which is disposed in proximity to the seat 16 that is secured to the cross bar 6 by the seat support 17.

Foot pieces 18 are secured to the cross bar 8 and afford means whereby the operator seated on the seat 16 may rest his feet to support his body while he is manipulating the sled or guiding runner.

From the foregoing it will be readily seen that by rotating the steering wheel 15 the pinion will be fed longitudinally of the rack bar 7 causing the flexible guiding runner 9 to move correspondingly and accomplish the guiding of the sled.

I claim:

1. A sled including supporting runners and a center flexible steering member, a rack bar connecting the supporting runners, a pinion mounted on the flexible runner, and means for moving the pinion over the rack bar to move the flexible runner laterally to steer the sled.

2. A sled including supporting runners and a central steering runner, a rack bar connecting the supporting runners, a pinion mounted on the steering runner, and means for moving the pinion over the rack bar to move the steering runner laterally to steer the sled.

3. A sled including supporting runners, a central steering runner disposed between the supporting runners and having its front end extended beyond the front ends of the supporting runners, a rack bar connecting the supporting runners, a pinion carried by the steering runner and cooperating with the rack bar, and means for rotating the pinion to move the steering runner longitudinally of the rack bar to move the steering runner to guide the sled.

In testimony that I claim the foregoing as my own, I have hereto affixed my signature.

GEORGE A. HARDEN.